Patented Sept. 17, 1940

2,214,851

UNITED STATES PATENT OFFICE 2,214,851

AMINOPLAST CONTAINING AMINOESTER SALTS

Gaetano F. D'Alelio, Pittsfield, Mass., assignor to General Electric Company, a corporation of New York No Drawing. Application August 2, 1939, Serial No. 288,034

16 Claims. (Cl. 260—33)

This invention relates broadly to resinous compositions. More particularly it is concerned with a novel method of converting soluble, fusible aminoplasts to the insoluble, infusible state and to the improved laminating and molding compositions produced by the method. As is well known, aminoplasts are synthetic resins prepared from amino or amido compounds, a typical example being urea-formaldehyde resin.

I have discovered that when an aminoester salt is incorporated into a normally non-curing aminoplast it functions simultaneously as a latent curing agent or catalyst and as a plasticizing agent for the resin. This is quite surprising, since the known properties of aminoester salts are not such as would enable one to predict that they would have this dual functionality. Heretofore these results have been accomplished by the addition of two separate bodies, one acting as a plasticizing agent and the other as a latent curing catalyst. A latent curing catalyst is understood in this art to mean a chemical body which, under the influence of heat or heat and pressure at some threshold temperature, functions as a curing agent for the resinous condensation product. A plasticizing agent is generally considered to be a body which, during the process of pressure fabrication of the resinous material, assists such material in more readily adapting itself to the shape of a mold; or a body which contributes flexibility, machinability or elasticity to the final molded, cast or laminated product.

By practicing the present invention the addition of two distinct bodies, one serving as a plasticizing agent and the other as a curing catalyst, is obviated. The combination of aminoester organic or inorganic salts as addition agents with aminoplasts also has other advantages. For example, when an aminoester salt containing at least 6 carbon atoms in the ester chain, preferably 8 or more carbon atoms (for instance, glycine octyl ester hydrochloride, glycine decyl ester hydrochloride, etc.), is used, the need for mold lubricants and water repellents in the molding composition is eliminated.

The aminoester salts used in practicing the present invention contain an amino or imino group which has been converted to a salt by the addition of an organic or inorganic acid. An example of such a salt is glycine ethyl ester hydrochloride, $HCl.NH_2CH_2COOC_2H_5$. Such salts may be written graphically as

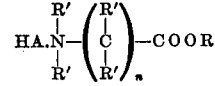

where R is a radical such, for example, as alkyl, alkylene, aryl, arylene, aralkyl, alkaryl, naphthyl, hydrocyclic, heterocyclic, and R' is hydrogen or any of the radicals represented by R. In the above formula $n$ is zero or any numerical value and HA is an organic or inorganic acid. Illustrative examples of acids represented by HA are inorganic acids such as hydrochloric, sulfuric, hydroiodic, hydrobromic, hydrofluoric, nitric, phosphoric, etc., and organic acids such as oxalic, malonic, succinic, adipic, formic, acetic, propionic, furoic, citric, tartaric, itaconic, maleic, citraconic, acrylic, methacrylic, etc.

The aminoester salts (salts of aminoesters) may be readily prepared by esterifying an aminoacid with an alcohol in the presence of the desired salt-forming acid, with or without the addition of an esterification catalyst. Illustrative examples of aminoacids which may be used in the preparation of the ester salts of this invention are glycine (glycocoll), alanine, alpha amino butyric acid, alpha amino valeric acid, valine (isopropyl alpha amino acetic acid), glycoleucine, leucine (alpha isobutyl alpha amino acetic acid), isoleucine, ethyl methyl alpha amino propionic acid, serine (beta hydroxy alpha amino propionic acid), cysteine, beta thio alpha amino propionic acid, cystine, aspartic acid, glutamic acid, tyrosine, phenyl alanine, tryptophane (alpha amino beta indole propionic acid), proline (alpha pyrrolidine carboxylic acid), histidene (alpha amino beta imidazole propionic acid), oxy-proline, arginine (alpha amino delta guanidine valeric acid), lysine (alpha epsilon diamino caproic acid), ortho, meta and para amino benzoic acids, beta amino propionic acid, etc.

Many alcohols or esterifiable hydroxy compounds may be used for the preparation of the ester salts of this invention, such as methyl, ethyl, propyl, butyl, amyl, hexyl, octyl, nonyl, decyl, undecyl, dodecyl, octadecyl, benzyl, cyclohexyl, phenyl ethyl alcohols, ethylene glycol, diethylene glycol, glycerine, etc. These alpha aminoester salts are most readily obtained, however, by heat treatment of proteins in the presence of water, the desired acid and the desired alcohol. The crude product thus obtained may be purified to a high degree by recrystallization processes. It is not an essential of this invention that a single aminoester salt be used since a mixture of such substances, such as are obtained by acidic protein alcoholysis, are suitable.

In order that those skilled in the art better may understand how this invention may be carried into effect, the following examples are given by way of illustration. All parts are by weight.

Example I

|   | Parts |
|---|---|
| Urea | 60.0 |
| Aqueous ammonia (28%) | 15.0 |
| Aqueous formaldehyde (37.1%) | 160.0 |
| Sodium hydroxide in one part water | 0.04 |
| Glycine ethyl ester hydrochloride | 0.6 |

All of the components with the exception of the aminoester inorganic salt, specifically glycine ethyl ester hydrochloride, were refluxed for approximately one-half hour to form a resin syrup. The glycine ethyl ester hydrochloride was dissolved in this syrup. This syrup was heated on a hot plate at 130 to 150° C., yielding a clear, homogeneous, rapidly curing, continuous resin film of good water-resistance. When aminoester salts were omitted from the above formulation, a sticky, uncured, blistered resin which shredded and disintegrated in water was obtained.

Example II

|   | Parts |
|---|---|
| Aminoester salt-containing syrup of Ex. I | 23.0 |
| Alpha flock | 7.0 |
| Zinc stearate | 0.04 |

The above components were compounded to produce a molding composition which thereafter was dried for 5¼ hours at approximately 50° C. On subjecting the dried composition to a temperature of the order of 100° to 150° C., preferably from approximately 120° to 150° C., and under a pressure of the order of 1,000 to 4,000 pounds per square inch, well cured molded articles were obtained. The molding compositions had very good flow characteristics. The molded articles were translucent-white in color and of uniform density.

The aminoester salt-containing resinous composition of this example also is particularly suitable for use in the production of laminated articles. For example, fiber sheet material such as paper, cloth, etc. may be coated and impregnated with the resin syrup, the sheets dried and thereafter superposed and subjected to heat and pressure to bond the sheets firmly together.

Molding compositions prepared in a manner similar to that above described, but containing no aminoester salt, after being dried for 6 to 48 hours and the dried material then molded under similar conditions gave sticky, uncured blistered articles.

Example III

|   | Parts |
|---|---|
| Urea | 60.0 |
| Hexamethylenetetramine | 17.5 |
| Aqueous formaldehyde (37.1%) | 150.0 |
| Glycine ethyl ester hydrochloride | 1.0 |

All of the above components with the exception of the glycine ester salt, specifically glycine ethyl ester hydrochloride, were refluxed for approximately one-half hour to form a resin syrup. The glycine ethyl ester hydrochloride was dissolved in this syrup. Cured resins were produced as described under Example I and had the same general characteristics as the products of that example.

Example IV

|   | Parts |
|---|---|
| Aminoester salt-containing syrup of Ex. III | 23.0 |
| Alpha flock | 7.0 |
| Zinc stearate | 0.04 |

The above components were suitably mixed together to produce a molding composition which was dried for 9 hours at approximately 50° C. Heat- and pressure-hardened articles made from this molding composition as described under Example II had the same general characteristics as the products of that example.

Although in the foregoing examples I have shown the aminoester salt as being introduced into the resin at the end of the initial condensation reaction, I am not limited to this specific procedure. For example, the aminoester salt may be added at the start of the condensation reaction or after the other components have partially reacted. Or, the aminoester salt may be mixed with the components of the molding composition at any convenient stage in the preparation of such compositions. Preferably, I incorporate the aminoester salt into the resin syrup as described in the illustrative examples.

The amount of aminoester salt which is incorporated into the resin or into the molding composition may vary considerably, depending largely upon the particular salt employed and the particular curing rates desired. In general, however, only a relatively small amount of aminoester salt is used, and preferably not exceeding substantially one-tenth mole of such salt per mole of urea substance.

Of course, it will be understood by those skilled in the art that this invention is not limited to the use of urea in the preparation of the resinous composition. Thus instead of urea I may use thiourea; substituted ureas such as methyl urea, acetyl urea, benzoyl urea, phenyl thiourea, assymmetrical diethyl urea, allyl urea, 2-chloroallyl urea, ethylidene urea, methylol urea, methylene urea, etc.; or substances of the nature of urea, for instance guanidine, dicyandiamide, guanyl urea, guanylthiourea, biguanidine, aminoguanidine, aminotriazole, creatine, creatinine, guanoline, ethylene pseudosulfocarbamide derivatives, sulfohydantoin, triazine derivatives, etc.

The particular aldehyde which is used in making the improved aminoplast of this invention is dependent largely upon economic conditions and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aldehydes.

While I have described my invention with particular reference to the curing of urea-aldehyde condensation products, it will be understood of course that other modifying bodies may be introduced into the resin before, during, or after effecting condensation between the primary components. Thus, as modifying agents I may use, for example monohydric alcohols such as ethyl, propyl, isopropyl, butyl, amyl, etc.; polyhydric alcohols such as ethylene glycol, diethylene glycol, glycerol, pentaerythritol, tri-methylol nitro methane, etc.; mono- or poly-amides; amines; phenols; aminophenols; ketones; etc. The modifying bodies also may take the form of high molecular weight bodies, with or without resinous characteristics, for example lignin, partially hydrolyzed wood products, proteins, protein-aldehyde condensation products, phenol-aldehyde condensation products, polyhydric alcohol-polybasic acid condensation products, natural gums and resins, etc. Dyes, pigments, plasticizers, mold lubricants, opacifiers and various fillers may be compounded with the resin in accordance with conventional practice to produce molding compositions and molded articles best fitted to meet a particular service application.

The modified or unmodified resinous compositions of this invention have a wide variety of uses. For example, in addition to their use in the production of molding compositions, they may be employed in making protective surfacing materials, for example paints, varnishes, etc. They may be used in making arc-extinguishing tubes capable of evolving an arc-extinguishing gas under the heat of the arc, in the production of wire or baking enamels, and for bonding or cementing together mica flakes to form a laminated mica article. They also may be used as anti-creasing agents, as impregnants for electrical coils and other elctrical devices, and for other purposes.

What I claim as new and desire to secure by Letters Patent of the United States is:

1. A composition of matter comprising a soluble fusible aminoplast having incorporated therein an aminoester salt as an accelerator of curing.

2. A resinous composition comprising a soluble fusible aminoplast containing an organic salt of an ester of an aminoacid as a curing catalyst.

3. A resinous composition comprising a soluble fusible aminoplast containing an inorganic salt of an ester of an aminoacid as a curing catalyst.

4. A composition of matter comprising a normally non-curing, alcohol-modified aminoplast having incorporated therein an aminoester salt as an accelerator of curing.

5. A resinous composition comprising a normally non-curing aminoplast containing an aminoester hydrochloride as a curing catalyst.

6. A resinous composition comprising a soluble fusible urea-aldehyde resin having incorporated therein a curing agent consisting of a mixture of aminoester salts.

7. A molding composition comprising a normally non-curing urea-aldehyde resin having incorporated therein a curing agent consisting of a glycine ester salt.

8. A molding composition comprising a filler and a soluble fusible urea-formaldehyde resin containing glycine ethyl ester hydrochloride as a curing catalyst.

9. A resinous composition comprising a normally non-curing aminoplast resin containing a glycine octyl ester salt as an accelerator of curing.

10. A product comprising the cured resinous composition of claim 3.

11. An article of manufacture comprising the heat- and pressure-hardened molding composition of claim 7.

12. The method of curing a normally non-curing aminoplast which comprises incorporating into such aminoplast a small amount of an aminoester salt, and subjecting the resulting composition to a temperature of the order of 100° to 150° C.

13. A product comprising the cured resinous composition of claim 2.

14. A composition of matter comprising (1) a soluble, fusible resinous reaction product of a urea and formaldehyde and (2) an accelerator of curing of said reaction product comprising an aminoester salt in an amount not exceeding substantially one-tenth mole of such salt per mole of the urea component of said reaction product.

15. A molded article of manufacture comprising an aminoplast cured to an insoluble, infusible state with an aminoester salt.

16. A composition comprising a normally non-curing aminoplast and a curing agent therefor comprising a salt of an ester of an amino acid, said ester containing at least six carbon atoms in the ester chain.

GAETANO F. D'ALELIO.